Figure 4:
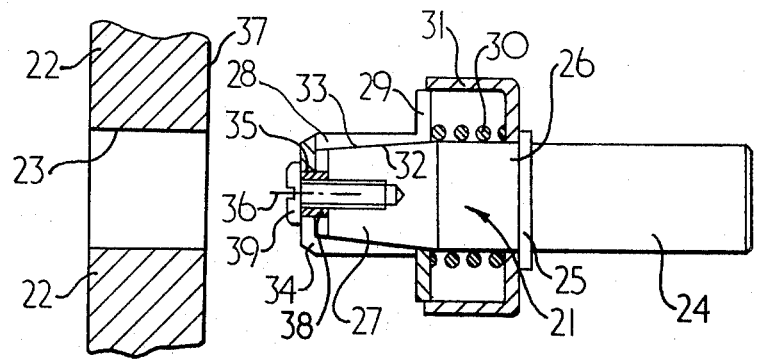

United States Patent
Riley

[15] 3,678,790
[45] July 25, 1972

[54] MACHINE TOOLS

[72] Inventor: Raymond A. Riley, Bulkington near Nuneaton, England

[73] Assignee: The Dunlop Company Limited, London, England

[22] Filed: June 2, 1970

[21] Appl. No.: 42,835

[30] Foreign Application Priority Data

June 5, 1969 Great Britain......................28,420/69

[52] U.S. Cl. ........................................82/38, 82/1 C, 82/2.5, 82/44, 279/1
[51] Int. Cl..........................................................B23b 25/00
[58] Field of Search ......................82/2.5, 2.7, 44, 38; 279/1, 279/2, 51, 41, 46, 102, 1 L, 1 E, 1 SG, 1 C

[56] References Cited

UNITED STATES PATENTS

| 420,616 | 2/1890 | Brightman | 82/44 |
| 2,379,210 | 6/1945 | Alyea | 82/44 X |
| 2,427,322 | 9/1947 | Darner | 279/51 X |
| 2,544,633 | 3/1951 | LeCount | 279/2 X |

*Primary Examiner*—Leonidas Vlachos
*Attorney*—Ward, McElhannon, Brooks & Fitzpatrick

[57] ABSTRACT

A loading device for a machine tool in which a workpiece holder is arranged to be mounted on a machine tool, the workpiece holder having releasable gripping means associated therewith for retaining the workpiece. The gripping means is provided with a tapering surface arranged to provide, in conjunction with a cooperating tapering surface on the workpiece holder, a sticking-taper wedging action to grip the workpiece on axial movement of the workpiece into or over the gripping means. The gripping means is also arranged to permit the workpiece to be withdrawn therefrom solely by an axially directed extracting force applied to the workpiece, of which the following is a specification.

7 Claims, 4 Drawing Figures

MACHINE TOOLS

This invention relates to machine tools, and more particularly to loading devices for machine tools.

One object of the present invention is to provide an improved method and apparatus for feeding workpieces to an automatic lathe.

According to one aspect of the invention a loading device for a machine tool comprises a workpiece holder arranged to be mounted on a machine tool, the workpiece holder having releasable gripping means associated therewith for retaining the workpiece, the gripping means being provided with a tapering surface arranged to provide, in conjunction with a cooperating tapering surface on the workpiece holder, a sticking-taper wedging action to grip the workpiece on axial movement of the workpiece into or over the gripping means, the gripping means also being arranged to permit the workpiece to be withdrawn therefrom solely by an axially directed extracting force applied to the workpiece.

According to another aspect of the invention, a method of feeding a workpiece to a machine tool chuck comprises feeding the workpiece to a loading device of the kind described in the preceding paragraph mounted on the machine tool, moving the loading device into alignment with the chuck and moving the workpiece axially to bring its other end into engagement with the chuck.

The term "sticking-taper wedging action" as used in this specification is intended to mean a wedging action maintained solely by virtue of the friction between cooperating tapering surfaces.

The loading device may comprise a hollow receptacle arranged to be mounted on a machine tool and having an open end into which a workpiece can be inserted, and releasable gripping means for retaining the workpiece within the receptacle by a sticking taper wedging action as described above whilst permitting the workpiece to be withdrawn therefrom solely by applying an axially directed extracting force to the workpiece.

Alternatively, a loading device specifically intended for use with workpieces each having an axial bore at the end to be held by the loading device may comprise a workpiece holder in the form of a projection arranged to enter the axial bore, and releasable gripping means for retaining the workpiece on the projection by a sticking-taper wedging action as described above whilst permitting the workpiece to be withdrawn therefrom solely by applying an axially directed extracting force to the workpiece.

The gripping means for the loading device described in the preceding paragraph may comprise an axially movable radially expansible sleeve surrounding and in engagement with a tapered portion of the projection to provide a sticking-taper wedging action as the workpiece is moved axially in engagement with the sleeve in a direction to cause the projection to enter the axial bore in the workpiece.

Preferably, the gripping means comprises an axially movable gripping member within the receptacle having a plurality of springy fingers arranged with tapered surfaces engageable with the wall of the receptacle to provide a sticking-taper wedging action as the gripping member is moved into the receptacle.

Figure 1:
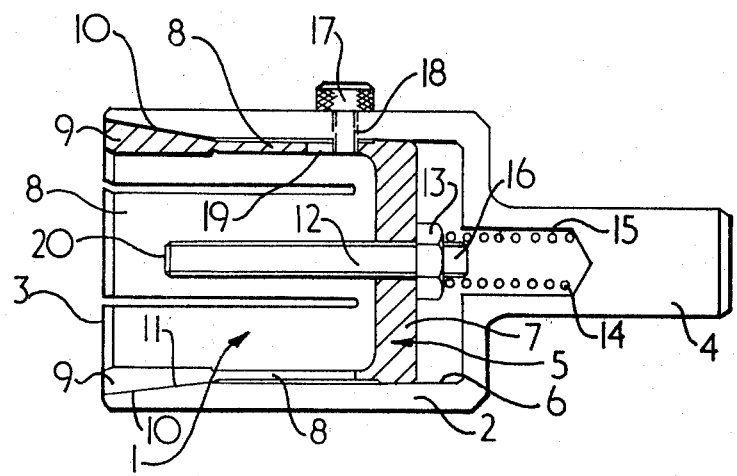
Figure 3:
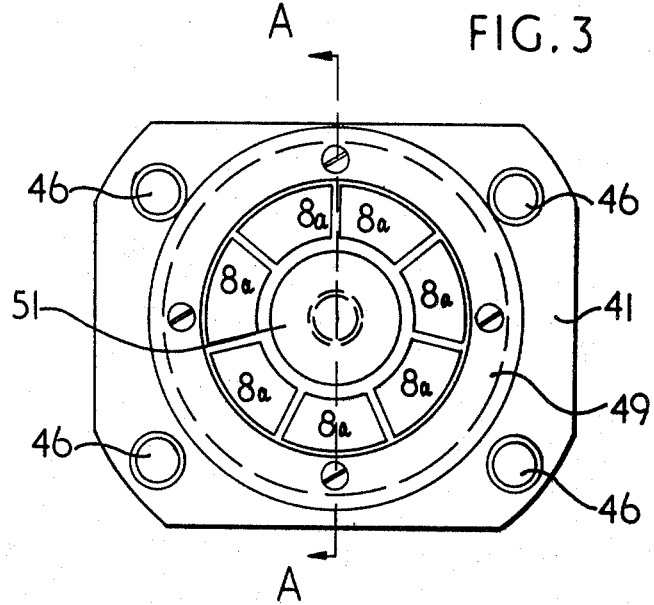
Figure 2:
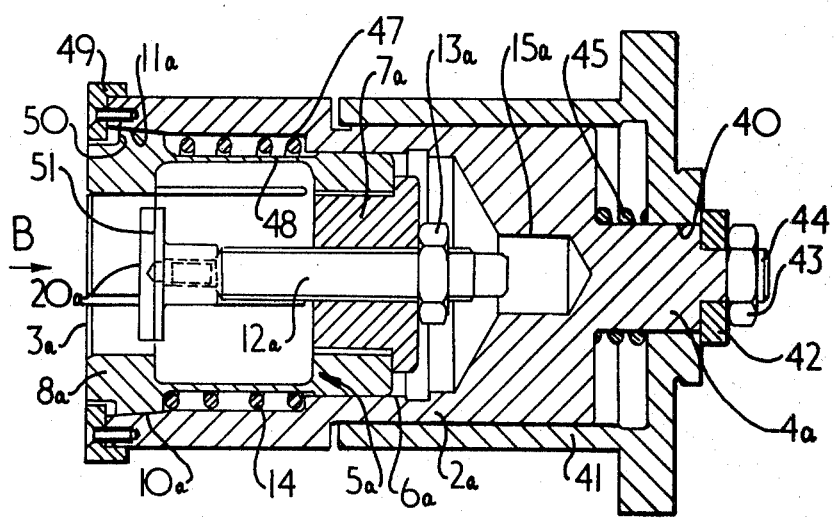

Several embodiments of the invention will now be described by way of example with reference to the accompanying drawings of which:

FIG. 1 is a longitudinal sectional view of a loading device in accordance with the present invention, FIG. 2 is a longitudinal sectional view, on the sectional line A—A of FIG. 3, of a second form of loading device in accordance with the present invention, FIG. 3 is an end view of the device shown in FIG. 2 looking in the direction of the arrow B of FIG. 2 and FIG. 4 is a longitudinal sectional view of a third form of loading device in accordance with the present invention.

An automatic component loading device 1 (see FIG. 1) for use with an automatic capstan lathe (not shown) comprises a receptacle 2 for workpieces which is arranged to be mounted on one of the faces of the lathe turret. The receptacle comprises a hollow cylindrical body having one open end 3 and provided at the other end with a shank 4 for location of the receptacle in a corresponding socket formed in the turret face.

Gripping means in the form of a gripping member 5 is mounted in axially slidable engagement with the inner surface 6 of the wall of the receptacle 2, and consists of a base portion 7 from which five axially extending fingers 8 project towards the open end of the receptacle to form a collet. The axially outer ends 9 of the fingers are tapered on their radially outer surfaces 10 making an angle of from 5° to 7° with the axial direction and engage a correspondingly tapered surface 11 on the inner surface of the wall of the receptacle to provide a sticking-taper wedging action as the gripping member is moved axially into the receptacle, the outer ends of the fingers being forced radially inwardly by the wedging action.

The gripping member is provided with an axially aligned abutment screw 12 secured centrally in a screw-threaded bore in the base of the gripping member and provided with a locknut 13. A return spring 14 is located in a socket 15 formed in the shank and engages the portion 16 of the screw projecting through the base of the gripping member so as to urge the gripping member axially outwardly relative to the receptacle. The axial movement of the gripping member within the receptacle is limited by means of a restrictor screw 17 passing radially through a bore 18 in the wall of the receptacle and entering an axially extending slot 19 formed in one of the fingers.

In operation, the turret (not shown) is indexed to a position in which the loading device is located adjacent a loading station. At the loading station workpieces (not shown) are fed to a loading position in which a pneumatically operated plunger (not shown) is automatically actuated to press a workpiece into the receptacle. On entering the receptacle, the workpiece engages the projecting end 20 of the abutment screw and forces the gripping member axially inwardly. Various extensions or heads (see detail 51 of FIG. 2) may be fitted to the abutment screw to cover holes in the abutting end of the workpiece. The sticking-taper wedging action between the fingers and the wall of the receptacle causes the collet to grip the workpiece securely.

The turret is then indexed to a position in which the loading device is located axially in line with the spindle axis (not shown) and is moved so as to press the workpiece into the chuck (not shown), where it is gripped by a conventional automatic gripping mechanism. The loading device is then withdrawn leaving the workpiece in position in the chuck, the gripping member moving forward under pressure from the return spring into a position ready to receive the next component.

The loading device described above is of particular value in what is known as "second operation" work. In work of this kind, the workpieces generally have a relatively narrow end which has to be inserted into the chuck so that a machining operation can be carried out on the projecting, relatively larger diameter, end. Difficulties have arisen in the past in the design of automatic loading apparatus for feeding workpieces of this kind automatically into a chuck since it is difficult to support the relatively narrow end of the component as it is fed axially into the chuck: any support which may be provided for the narrow end tends to interfere with the axial movement of the workpiece into the chuck. The improved method and loading device according to the invention overcome these difficulties since the component is fed initially, from a chute or other means, with its larger end presented towards the loading device. Once the workpiece is located in the loading device, it is held securely in accurate axial alignment for insertion into the chuck.

Although in the embodiment described above the gripping member comprises five fingers the number of fingers may be varied to meet individual design requirements.

A second form of loading device in accordance with the present invention, basically similar in construction and function to the device shown in FIG. 1, is shown in FIGS. 3 and 4. Parts similar in function to those shown in FIG. 1 are similarly numbered with the suffix *a* added.

In the second form of the device the shank 4*a* of the receptacle 2*a* passes through a central aperture 40 in an adaptor 41, the shank being secured to the adaptor by a retaining collar 42 and locking nut 43 engaging a screw-threaded portion 44 of the shank. The locking nut is tensioned by a compression spring 45 acting between the receptacle and the adaptor.

The adaptor is provided with four outer apertures 46 arranged to receive attachment bolts (not shown) or other suitable attachment means to secure the adaptor to the lathe turret (not shown).

The gripping member return spring 14*a* is located in an annular recess formed by an increased-internal-diameter portion 47 of the receptacle and a cooperating annular groove 48 on the outer surface 10*a* of the gripping member. Axial movement of the gripping member out of the receptacle is limited by a locating ring 49 secured to the open end 3*a* of the receptacle and arranged to project radially inwardly of the inner surface 11*a* of the receptacle to engage a co-operating abutment 50 on the gripping member.

The gripping member 5*a* is provided in the seven fingers 8*a*, the radially outer surface 10*a* of each finger being tapered as described previously to provide a sticking-taper wedging action in conjunction with the corresponding tapered surface 11*a* on the inner surface of the receptacle.

In a third form of the invention, shown in FIG. 4, an automatic loading device 21 for use with components 22 each having an axial bore 23 at the end to be held by the loading device comprises a projection 24 in the form of a cylindrical shank arranged to be mounted on a turret face (not shown). The shank has a collar 25 formed thereon from which projects a cylindrical portion 26 terminating in a nose portion 27 tapered at an angle of 5° to 7°. A gripping member 28 in the form of a sleeve of top-hat shape is fitted around the nose portion, the flange end 29 of the sleeve being nearer to the collar 25 and being urged axially outwardly along the nose portion by a coiled return spring 30 surrounding the cylindrical portion 26 and abutting the sleeve 28 at one end and the collar at the other end. A cover member 31, arranged to protect the return spring, may be interposed between the collar and the spring in the manner shown in FIG. 4.

The sleeve 28 is of tapered internal form, see detail 32, and is arranged to slide on the tapered surface 33 of the nose portion. The sleeve may be formed from either of springy material suitably slotted from one or alternate ends to permit radial expansion or alternatively the sleeve may be of segmental form (not shown) in which the segments are held together by a springy circlip. The axially outer end 34 of the sleeve is closed, apart from a central opening 35 through which a restrictor member in the form of a screw 36 passes surrounded by a spacing sleeve 38. The head 39 of the screw secures the closed end of the sleeve to the projection and prevent it from moving axially outwardly therefrom beyond a predetermined distance, axially inward movement of the head of the screw towards the projection being limited by the spacing sleeve 38.

In operation a workpiece 22 having an axial bore 23 passes over the springy sleeve 28 until its leading face 37 contacts the flange 29 of the sleeve, or, as an alternative in the case of a component having a counterbore (not shown), until the closed end 4 of the sleeve is contacted by the shoulder formed between the bore and the counterbore. The sleeve 28 is moved axially along the tapered portion 32 of the projection to provide a sticking-taper wedging action which causes the sleeve to expand and grip the workpiece.

When the workpiece is gripped by a chuck and withdrawn from the holding device, the return spring moves the sleeve axially outwardly to the unexpanded position, ready to receive the next component.

Having now described my invention, what I claim is:

1. A loading device for a machine tool comprising a workpiece holder arranged to be mounted on a machine too, said workpiece holder having releasable gripping means associated therewith for retaining the workpiece, said gripping means being provided with a tapering surface arranged to provide, in conjunction with a cooperating tapering surface on the workpiece holder, a sticking-taper wedging action to grip the workpiece on axial movement of the workpiece into or over the gripping means, said gripping means also being arranged to permit the workpiece to be withdrawn therefrom solely by an axially directed extracting force applied to the workpiece, said workpiece holder comprising a receptacle having a hollow cylindrical body open at one end and provided at the other end with locating means for location of the receptacle on the machine tool, said gripping means being arranged to be in axially slidable engagement with the inner surface of the receptacle, said gripping means comprising a gripping member comprising a base portion arranged to be adjacent the closed end of the receptacle and a plurality of axially extending fingers projecting from the base portion towards the open end of the receptacle to form a collet, at least a portion of the radially outer surface of each finger being tapered and arranged to engage a correspondingly tapered surface inside the receptacle.

2. A device according to claim 1 wherein the axially outer ends of the fingers are tapered on their radially outer surfaces.

3. A device according to claim 1 wherein the gripping member is provided with an axially aligned abutment screw mounted in a screw-threaded bore in the base portion of the gripping member, the abutment screw being arranged to engage the end of the workpiece entering the gripping member.

4. A device according to claim 1 wherein the axial movement of the gripping member within the receptacle is limited by a restrictor screw arranged to pass through a radial bore in the receptacle and to enter an axially extending slot formed in one of the fingers of the gripping member.

5. A device according to claim 1 wherein axial movement of the gripping member out of the receptacle is limited by a locating ring secured to the open end of the receptacle and arranged to project radially inwardly of the inner surface of the receptacle to engage an abutment on the gripping member.

6. A device according to claim 1 wherein a return spring is arranged to operate between the end portion of the gripping member and the closed end of the receptacle.

7. A device according to claim 1 wherein a return spring is arranged to operate in an annular recess formed by an increased internal diameter portion of the receptacle and a cooperating annular groove on the outer surface of the gripping member.

* * * * *